United States Patent
Ide et al.

(10) Patent No.: US 8,728,261 B2
(45) Date of Patent: May 20, 2014

(54) METHOD FOR PRODUCING CERAMIC JOINED BODY

(75) Inventors: Takayuki Ide, Fukuoka (JP); Masami Ando, Fukuoka (JP)

(73) Assignee: TOTO Ltd., Fukuoka (JP)

( * ) Notice: Subject to any disclaimer, the term of this patent is extended or adjusted under 35 U.S.C. 154(b) by 0 days.

(21) Appl. No.: 13/115,870

(22) Filed: May 25, 2011

(65) Prior Publication Data

US 2012/0018074 A1    Jan. 26, 2012

(30) Foreign Application Priority Data

May 27, 2010   (JP) ................................. 2010-121309
Nov. 16, 2010  (JP) ................................. 2010-255777

(51) Int. Cl.
  *C03B 29/00*   (2006.01)
  *B29C 65/00*   (2006.01)
  *B41J 2/16*    (2006.01)

(52) U.S. Cl.
  USPC .......................... 156/89.11; 156/326; 156/283

(58) Field of Classification Search
  USPC ........................ 156/89.11, 326, 283
  See application file for complete search history.

(56) References Cited

U.S. PATENT DOCUMENTS

| | | | | |
|---|---|---|---|---|
| 3,094,679 A | * | 6/1963 | O'Connor et al. | 338/330 |
| 4,385,020 A | * | 5/1983 | Morelock | 264/122 |
| 4,526,649 A | * | 7/1985 | Gupta et al. | 216/34 |
| 4,636,434 A | | 1/1987 | Okamura et al. | |
| 4,952,533 A | * | 8/1990 | Hongu | 501/90 |
| 5,139,594 A | * | 8/1992 | Rabin | 156/89.25 |
| 5,340,014 A | * | 8/1994 | Sekhar et al. | 228/198 |
| 5,395,572 A | * | 3/1995 | Brotz | 264/43 |
| 5,942,064 A | | 8/1999 | Krenkel et al. | |
| 6,692,597 B2 | * | 2/2004 | Mako et al. | 156/89.11 |
| 2005/0020431 A1 | * | 1/2005 | Tani | 501/88 |
| 2008/0145293 A1 | * | 6/2008 | Carberry et al. | 423/276 |

FOREIGN PATENT DOCUMENTS

| | | | |
|---|---|---|---|
| EP | 0 827 942 A2 | | 3/1998 |
| EP | 1930306 A1 | * | 6/2008 |
| GB | 2022490 A | * | 12/1979 |
| JP | 60-127270 A | | 7/1985 |
| JP | 60-127720 A | | 7/1985 |
| JP | 03-112871 A | | 5/1991 |
| JP | 08157275 A | * | 6/1996 |
| JP | H08-157275 A | | 6/1996 |
| JP | H10-203877 A | | 8/1998 |
| JP | 2005-022905 A | | 1/2005 |

OTHER PUBLICATIONS

Hiroshi et al., JP 08-157275 Machine Translation, Published Jun. 1996.*

* cited by examiner

*Primary Examiner* — Philip Tucker
*Assistant Examiner* — Alex Efta
(74) *Attorney, Agent, or Firm* — Studebaker & Brackett PC (57) ABSTRACT

This producing method includes: a preparing step of preparing a pair of ceramic sintered bodies at least one of which is formed by a reaction sintering method and contains free silicon; a forming step of interposing a joining slurry between the joined surfaces of the pair of ceramic sintered bodies and thereafter drying the joining slurry, to form a fine particle layer, the joining slurry obtained by dispersing fine particles containing a carbon element in an organic solvent; and a joining step of heating the pair of ceramic sintered bodies in an inert atmosphere with the pair of ceramic sintered bodies held so that the fine particle layer is pressurized, to introduce the free silicon into the fine particle layer, thereby forming a joining layer containing at least silicon carbide so that the pair of ceramic sintered bodies are joined to each other, to obtain the ceramic joined body.

6 Claims, 6 Drawing Sheets

METHOD FOR PRODUCING CERAMIC JOINED BODY

CROSS-REFERENCES TO RELATED APPLICATIONS

The present application claims priority to prior filed Japanese Patent applications No. 2010-121309, filed on May 27, 2010 and No. 2010-256777, filed on Nov. 16, 2010, the entire contents of which are hereby incorporated by reference.

BACKGROUND OF THE INVENTION

1. Field of the Invention

The present invention relates to a method for producing a ceramic joined body obtained by joining ceramic sintered bodies to each other.

2. Description of the Related Art

Ceramics has heat resistance, corrosion resistance, and wear resistance higher than those of a metal and a plastic or the like, and can be used under severe conditions such as a high temperature environment and a corrosion environment. Of these, silicon carbide ceramics has excellent characteristics such as high rigidity, high thermal conductivity, and low thermal expansion properties, and is utilized as a high temperature structural member and a member for a semiconductor producing apparatus.

Thus, although the ceramics, particularly the silicon carbide ceramics is a useful material capable of being used in severe environments, it is difficult to make a complicated-shaped member and a large-sized member by the casting of the silicon carbide ceramics. Thus, in making the complicated-shaped member and the large-sized member, comparatively small ceramic sintered bodies, for example, a plurality of block-shaped ceramic sintered bodies are prepared, and the ceramic sintered bodies are joined to each other, to make the complicated-shaped member and the large-sized member.

The following Japanese Patent Laid-Open No. 60-127270 discloses a technique for diffusion-joining ceramic sintered bodies to each other via carbon. Specifically, organic matter is applied onto at least one of joined surfaces of a pair of ceramic sintered bodies. The organic matter is decomposed at a high temperature to form a hard carbon film. The pair of ceramic sintered bodies are heated at a temperature equal to or greater than the degradation temperature of the organic matter in a non-oxidative atmosphere with the joined surfaces of the ceramic sintered bodies brought into contact with each other. In the case of this joining method utilizing carbon diffusion, disadvantageously, it was difficult to uniformly control the whole thickness of a joining layer to a desired thickness.

As a technique for joining a plurality of ceramic sintered bodies to each other, silicon carbide joining for forming a region containing silicon carbide on a joined portion is also performed. For example, in a method described in the following Japanese Patent Laid-Open No. 2005-22905, first, a pair of silicon carbide ceramic sintered bodies are bonded to each other with an organic adhesive to form a preliminary ceramic bonded body. The preliminary ceramic joined body is then heated to 1400° C. or more in an inert gas atmosphere. The heated preliminary ceramic joined body and a joined part on which the organic adhesive is disposed are impregnated with molten silicon, to perform silicon carbide joining.

However, in this case, it is necessary to externally supply molten silicon in order to impregnate the joined part with the molten silicon, which complicates a joining technique. Furthermore, disadvantageously, it was difficult to uniformly dispose the externally added molten silicon in the whole joined part and to homogenize the whole joined part.

The following Japanese Patent Laid-Open No. 03-112871 discloses a technique for reducing the external supply of the molten silicon and performing silicon carbide bonding. In the Japanese Patent Laid-Open No. 03-112871, a silicon carbide ceramic sintered body (sintered body) made by a reaction sintering method and a porous silicon carbide ceramic sintered body (porous sintered body) are superimposed via a binder made of a thermosetting resin containing silicon carbide fine particles. The superimposed product is heat-treated at a temperature at which silicon is molten with sheet-shaped silicon superimposed on the upper surface of the porous sintered body.

SUMMARY OF THE INVENTION

In the method described in the Japanese Patent Laid-Open No. 03-112871, pores are infiltrated with the sheet-shaped silicon disposed on the upper surface of the porous sintered body, and the thermosetting resin of the binder reacts with carbonized carbon. However, also in this case, silicon is externally added in order to contain silicon molten in the joining step. Therefore, the complicated joining technique is not largely improved. Furthermore, the impregnating distance between the disposing position of the sheet-shaped silicon and the joining region is long. The long impregnating distance complicates the stable supply of the silicon. Particularly, in the case of a thick porous sintered body, disadvantageously, it is difficult to form a homogeneous joined surface. Furthermore, since the thermosetting resin is used for the binder, the binder layer is heat-contracted during a heat treatment, thereby causing variations in joining strength in the joined surface.

The present invention has been made in order to solve the above problems. It is an object of the present invention to provide a method for producing a ceramic joined body having high joining strength, which prevents a crack accompanying the heat contraction of a joining layer in a heat treatment step and a joining failure caused by the crack without externally adding silicon.

The present invention provides a method for producing a ceramic joined body obtained by joining a pair of ceramic sintered bodies to each other. Each of the pair of ceramic sintered bodies has a joined surface. The method includes: a preparing step of preparing the pair of ceramic sintered bodies at least one of which is formed by a reaction sintering method and contains free silicon; a forming step of interposing a joining slurry between the joined surfaces of the pair of ceramic sintered bodies and thereafter drying the joining slurry, to form a fine particle layer, the joining slurry obtained by dispersing fine particles containing a carbon element in an organic solvent; and a joining step of heating the pair of ceramic sintered bodies in an inert atmosphere with the pair of ceramic sintered bodies held so that the fine particle layer is pressurized, to introduce the free silicon into the fine particle layer, thereby forming a joining layer containing at least silicon carbide so that the pair of ceramic sintered bodies are joined to each other, to obtain the ceramic joined body.

The at least one of the pair of ceramic sintered bodies prepared in the preparing step of the present invention is formed by the reaction sintering method. Therefore, the free silicon is contained in the ceramic sintered body. The free silicon is present in a state of a metallic element which forms no compound in the sintered body, and has easily movable properties. Furthermore, the fine particle layer containing the fine particles containing the carbon element is formed between the joined surfaces of the pair of ceramic sintered bodies. When the ceramic sintered bodies are heated in this state, the silicon carbide is generated by carbon and the free silicon. Furthermore, the residual free silicon is diffused by the generation reaction of the silicon carbide as a driving force, and is moved to the fine particle layer between the pair of ceramic sintered bodies. Thus, the firm joining layer containing the silicon carbide can be formed without separately adding molten silicon.

Since the joining slurry contains the dispersed fine particles, a carbon source can be uniformly disposed on the joined surface. The reactivity between the fine carbon particles and the free silicon can be improved by uniformly disposing fine carbon particles on the joined surface. The improvement in the reactivity contributes to the further movement of the free silicon. In the joining slurry containing the organic solvent as a solvent, the solvent is already brought into an evaporated-up state at a point of time before a heat treatment. Therefore, even when the joining slurry is heated in the joining step, the volume change of the joining layer caused by the evaporation of the organic solvent, and the generation of a crack and displacement in the joining layer accompanying the volume change can be suppressed.

In the present invention, for example, the fine particles can be deposited with high density filling by controlling the dry condition of the organic solvent. A defect and the generation of a crack caused by further volume change can be suppressed by the precise deposition of the fine particles.

Thus, in the present invention, the sufficient strength of the whole joining layer can be secured by only the free silicon which is a trace of metal silicon infiltrated from the ceramic sintered body without externally adding metal silicon.

In the method for producing a ceramic joined body according to the present invention, it is preferable that at least one of the pair of ceramic sintered bodies prepared in the preparing step be formed by a reaction sintering method and contain free silicon and a boron element.

Although the melting point of silicon is 1414° C., the lowest liquid phase formation temperature of a Si—B system in which boron coexists is 1385° C. The liquid phase formation temperature is reduced by adding other components to the silicon. Therefore, the free silicon which is the metal silicon is easily moved under a joining condition, and is homogeneously diffused into the whole joined surface. Since the diffusion of the free silicon which is the metal silicon during the heat treatment is further accelerated, the more uniform and sufficient strength of the whole joining layer can be achieved.

It is preferable that the fine particle layer formed in the forming step further contain a boron element.

Although the melting point of the silicon is 1414° C., the lowest liquid phase formation temperature of a Si—C system in which carbon coexists is 1404±5° C., and the lowest liquid phase formation temperature of a three-component system of Si—B—C is reduced to about 1300° C. Therefore, the diffusion of the free silicon moved to the joining layer under the joining condition can be further accelerated. The silicon metal is easily moved under the joining condition, and is homogeneously diffused into the whole joined surface. Therefore, since the diffusion of the metal silicon element during the heat treatment is further accelerated, the more uniform and sufficient strength of the whole joining layer can be achieved.

It is also preferable that the pair of ceramic sintered bodies be heated at 1200° C. to 1500° C. in the joining step.

When the heating temperature of the joining step is made higher than the melting point of the silicon, the free silicon contained in the ceramic sintered body during the heat treatment serves as a liquid having a suitable viscosity. Thereby, the movement of the silicon to the joining layer containing the dried fine particles is accelerated, and the joining layer can be formed over the whole joined surface in a short time. On the other hand, it is desirable that the joining layer is sufficiently densified in the case of aiming at strong joining. The excessive rise of the heating temperature causes the heterogeneous formation of the joining layer and the degradation of the ceramic sintered body due to the evaporation of the silicon. The rapid generation of volume contraction accompanying the silicon carbonization of the silicon makes it difficult to stably make the ceramic joined body. Particularly, the effect prominently appears at a temperature exceeding 1500° C. Therefore, the rapid generation the silicon carbide in the joining layer, and the degradation of the ceramic sintered body caused by the evaporation of the silicon can be suppressed by setting the heating temperature to 1500° C. or less.

It is preferable that the inert atmosphere be an argon atmosphere in the joining step.

The reaction between the component in the atmosphere and free silicon, and the separation of the free silicon from the ceramic sintered body caused by the evaporation of the free silicon must be noted during the heat treatment in the joining step. In the preferable aspect, the problem in the reaction between the component in the atmosphere and the free silicon can be solved by selecting the argon atmosphere as the inert atmosphere. Simultaneously, the evaporation of the free silicon can be also suppressed.

It is preferable that the joining slurry be interposed between the joined surfaces of the pair of ceramic sintered bodies by spray coating in the forming step.

Carbon fine particles can be uniformly disposed on the whole joined surface by a simple method using spray coating. The precise deposition of the particles can be achieved by the moderate evaporation of the organic solvent generated simultaneously with the coating.

The present invention provides a method for producing a ceramic joined body having high joining strength, which prevents a crack accompanying the heat contraction of a joining layer in a heat treatment step and a joining failure caused by the crack without externally adding silicon.

DETAILED DESCRIPTION OF THE PREFERRED EMBODIMENT

Hereinafter, an embodiment of the present invention will be described with reference to the accompanying drawings. In order to facilitate the understanding of the description, in the drawings, constituent elements identical to each other will be referred to with numerals identical to each other if at all possible without repeating their overlapping descriptions.

Figure 1:
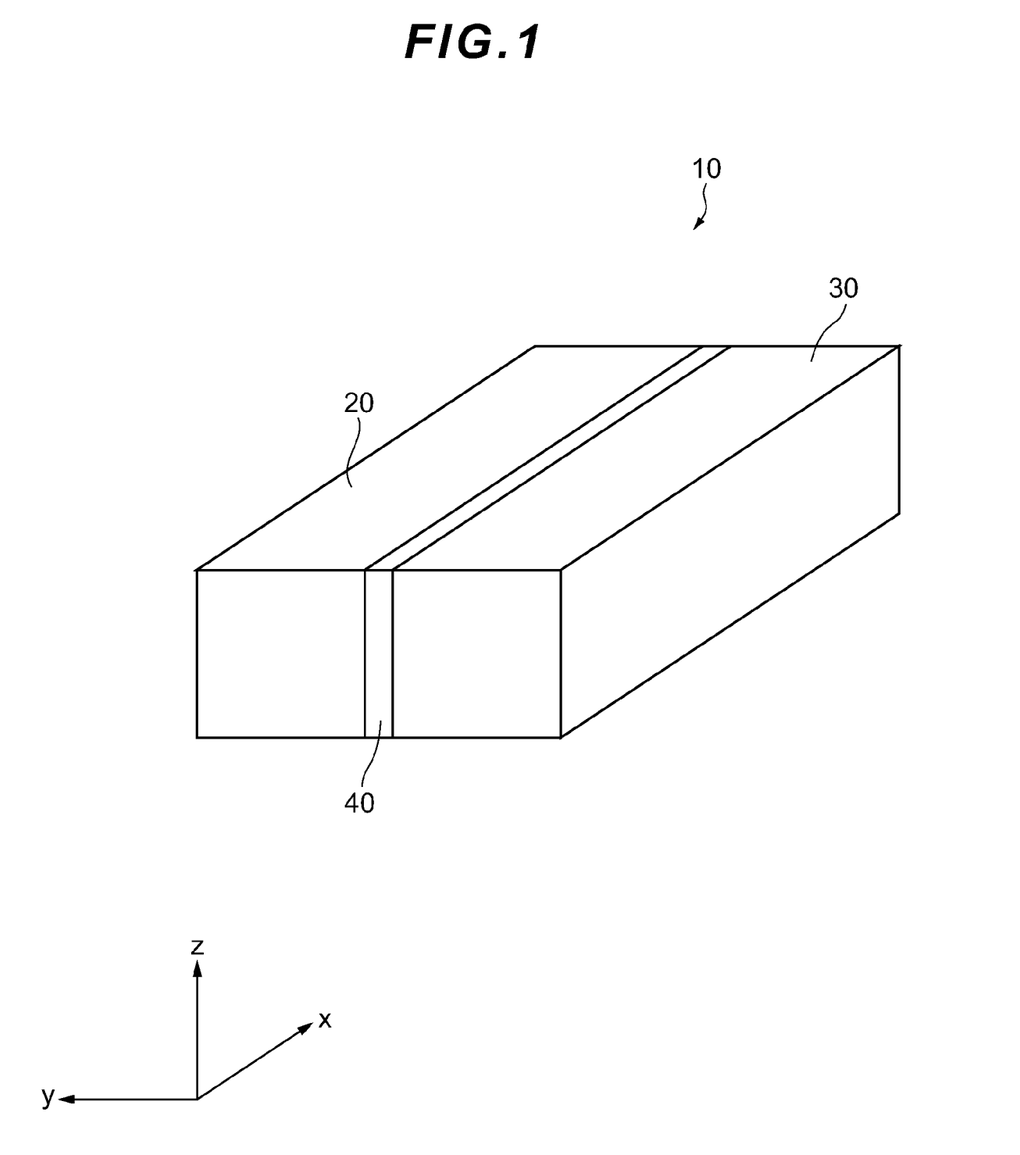
FIG. 1 is a schematic perspective view showing the constitution of a ceramic joined body obtained by a producing method according to an embodiment of the present invention.

A ceramic joined body obtained by a producing method according to the embodiment of the present invention will be described with reference to FIG. 1. FIG. 1 is a schematic perspective view showing the constitution of a ceramic joined body 10 according to the embodiment of the present invention. As shown in FIG. 1, a ceramic joined body 10 is constituted by joining a ceramic sintered body 20 and a ceramic sintered body 30 with a joining layer 40. In FIG. 1, an orthogonal coordinate system is set so that a zx-plane is formed as a plane along a joined surface on which the ceramic sintered body 20 and the ceramic sintered body 30 are joined, to set an x-axis, a y-axis, and a z-axis. The xyz-coordinate system will be appropriately used in the following description.

Various ceramics which can contain metal silicon can be used for the ceramic sintered body 20. Of these, silicon carbide ceramics containing metal silicon, boron carbide ceramics containing metal silicon, and a ceramic sintered body containing metal silicon, silicon carbide, and boron carbide are exemplified. The ceramics which can be used for the ceramic sintered body 20 as well as various ceramics containing no metal silicon can be used for the ceramic sintered body 30.

At least one of the two ceramic sintered bodies 20, 30 joined via the joined layer 40 may be made of ceramics containing metal silicon. However, both the ceramic sintered bodies 20, 30 are more preferably made of ceramics containing metal silicon since the adhesion between the ceramic sintered bodies 20, 30 and the joining layer 40 is increased.

The joining layer 40 is interposed between the ceramic sintered bodies 20, 30 to join the ceramic sintered bodies 20, 30. After a carbon source interposed between the ceramic sintered body 20 and the ceramic sintered body 30 is carbonized in a joining step (heat treatment step) to be described later, the metal silicon is infiltrated into the carbon source from any of the sintered bodies, and reacts with carbon. Thereby, a silicon carbide layer containing the metal silicon is formed.

Figure 2:
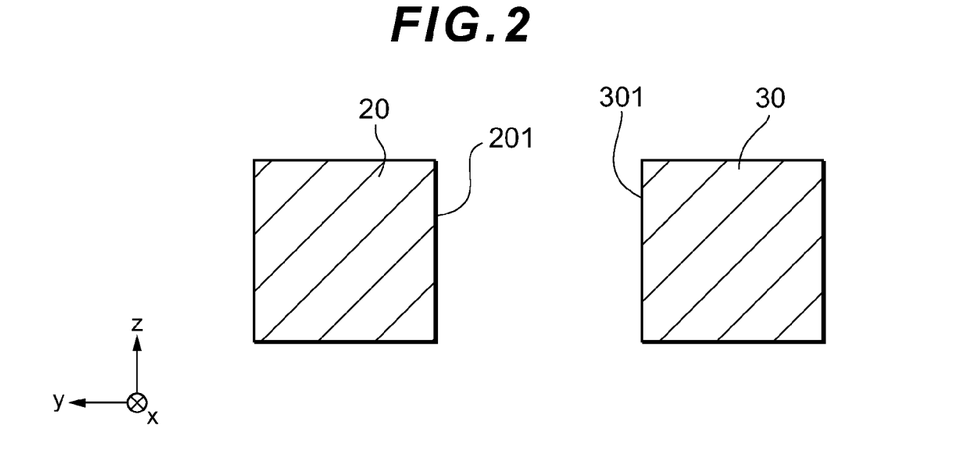
FIG. 2 is a view for illustrating a preparing step in the producing method of the ceramic joined body.
Figure 3:
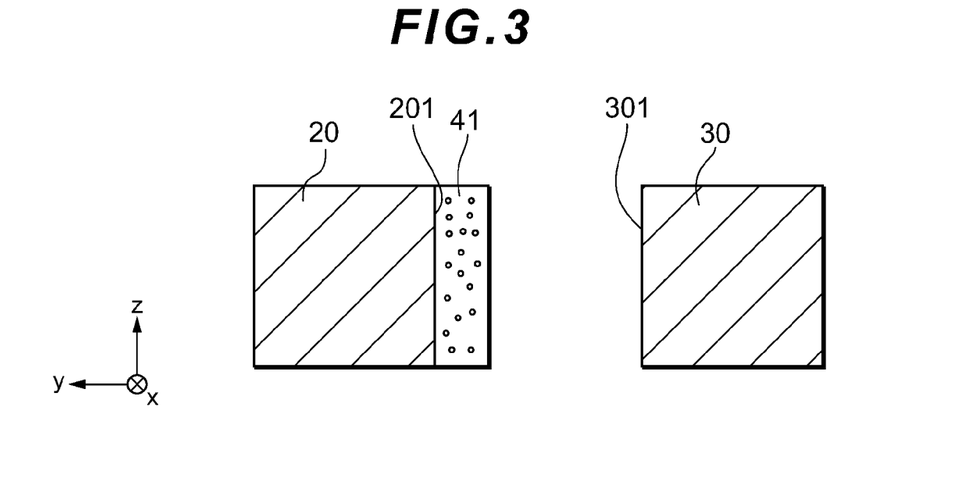
FIG. 3 is a view for illustrating a forming step in the producing method of the ceramic joined body.
Figure 4:
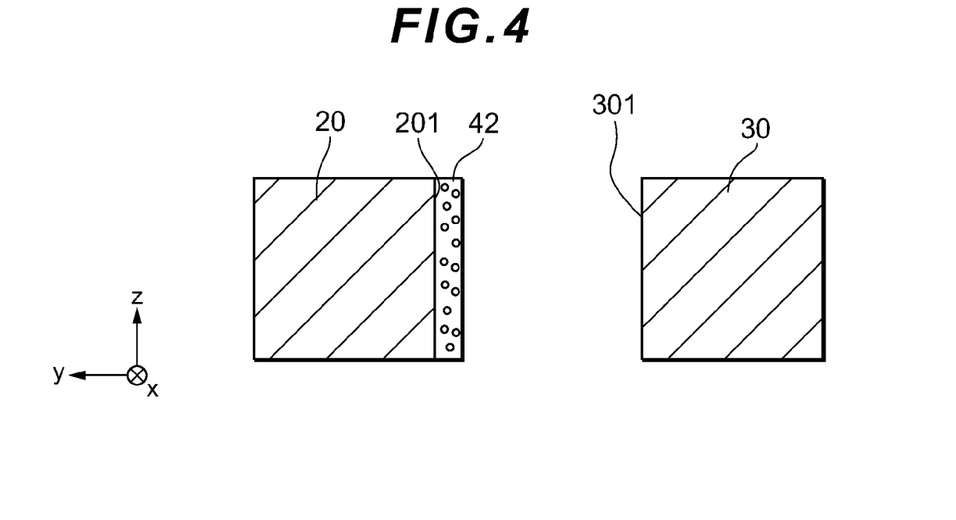
FIG. 4 is a view for illustrating a forming step in the producing method of the ceramic joined body.
Figure 5:
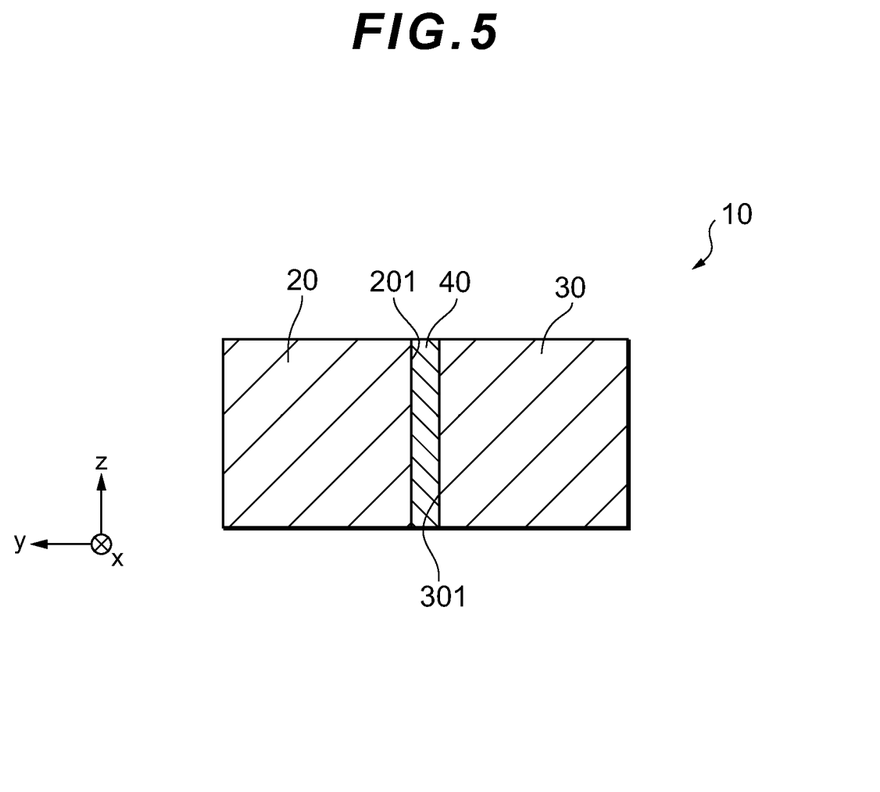
FIG. 5 is a view for illustrating a joining step in the producing method of the ceramic joined body.

Then, the producing method of the ceramic joined body 10 according to the embodiment of the present invention will be described with reference to FIGS. 2 to 5. FIG. 2 is a view for illustrating a preparing step in the producing method of the ceramic joined body 10. FIG. 3 is a view for illustrating a forming step in the producing method of the ceramic joined body 10. FIG. 4 is a view for illustrating a forming step in the producing method of the ceramic joined body 10. FIG. 5 is a view for illustrating a joining step in the producing method of the ceramic joined body 10. FIGS. 2 to 5 show a section taken in a plane including a yz-plane of FIG. 1 and passing through the vicinity of the center of the ceramic joined body 10.

As shown in FIG. 2, in the preparing step, the pair of ceramic sintered bodies 20, 30 respectively having joined surfaces 201, 301 are prepared. At least one of the ceramic sintered bodies 20, 30 is formed by a reaction sintering method, and contains free silicon.

The shapes of the joined surfaces 201, 301 to be butted, during joining are not limited. The joined surfaces 201, 301 can be joined by methods such as plane butting and fitting. Since the plane butting simply applies or sprays a joining slurry, the plane butting is preferable.

The surface roughness of the joined surfaces 201, 301 is not limited. The slurry is preferably applied to the extent that gaps are not formed. Ra=3 µm or less is preferably set, and Ra=0.5 µm or less is more preferably set.

In the forming step shown in FIGS. 3, 4, a joining slurry 41 is interposed between the joined surfaces 201, 301 of the pair of ceramic sintered bodies 20, 30. The joining slurry 41 is obtained by dispersing fine particles containing a carbon element in an organic solvent. The joining slurry 41 is then dried to form a fine particle layer 42.

Specifically, first, as shown in FIG. 3, the joining slurry 41 is applied onto the joined surface 201 of the ceramic sintered body 20. A slurry containing carbon fine particles, a slurry containing boron carbide fine particles, or a slurry containing powder obtained by mixing carbon fine particles and boron carbide fine particles can be used as the joining slurry 41.

The particle diameter of the fine particle may be 10 µm or less. The particle diameter is preferably 1 µm or less. The joining layer may be formed by spraying the joining slurry 41 using a spray or the like when the joining slurry 41 is applied, in that the thickness of the joining layer is easily adjusted. A joining thickness is easily controlled by spray coating.

Fine particles containing a carbon element can be utilized. Specifically, carbon fine particles can be used. Fine particles containing a boron element, as well as the carbon element are preferable. For example, any of boron carbide fine particles, boron fine particles, boric acid fine particles, and boron oxide fine particles can be used. Fine particles obtained by mixing carbon fine particles and fine particles containing a boron element can be also used.

As the organic solvent for dispersing the fine particles, an organic solvent having high fine particle dispersibility is preferable. An organic solvent having high volatility can be also suitably used. For example, methylene chloride, isopropyl alcohol, toluene, ethanol, acetone, and a solution obtained by appropriate combination thereof can be used. Water may be used as a solvent as long as the fine particles can be dispersed.

Then, as shown in FIG. 4, the organic solvent contained in the joining slurry 41 is evaporated to form the fine particle layer 42. The step is selectively employed, and dries an organic component being present in the joining slurry serving as the joining layer 40 during joining and heating. A drying temperature can be set to an ordinary temperature to 150° C.

Then, as shown in FIG. 5, a joining step is carried out as follows. The pair of ceramic sintered bodies 20, 30 are heated in an inert atmosphere with the ceramic sintered bodies 20, 30 held so that the fine particle layer 42 is pressurized. Therefore, the free silicon is introduced into the fine particle layer 42 to form the joining layer 40 containing at least silicon carbide so that the ceramic sintered bodies 20, 30 are joined to each other, thereby forming the ceramic joined body 10.

A temperature required for a joining treatment can be appropriately selected in the range up to a temperature of 1500° C. which is higher than the melting point of the metal silicon contained in the ceramic sintered body 20 and lower than the evaporation temperature of the metal silicon contained in the ceramic sintered body 20. The ceramic sintered body 20 of this embodiment already contains the metal silicon during the joining treatment. The movement of the metal silicon of the ceramic sintered body forms the joining layer 40 primarily containing the metal silicon. The residual solvent contained in the joining slurry may be completely evaporated by holding the ceramic sintered body at about 400 to 900° C. for a predetermined time in the temperature rise phase of the joining treatment.

In this embodiment, it is found that the metal silicon contained in the ceramic sintered body 20 is molten at a temperature of 1100° C. or more. In addition, the evaporation of the metal silicon cannot be disregarded at a temperature exceeding 1700° C. Therefore, a heat treatment temperature is preferably 1200 to 1500° C., and more preferably 1300 to 1400° C. at which the ceramic sintered body can be heat-treated at a temperature lower than the melting point (1412° C.) of metal silicon simple substance.

In the joining step, a pressure during a heat treatment can be appropriately selected in the range of 0.1 to 200 MPa. The whole formed product obtained by superimposing the ceramic sintered bodies 20, 30 may be pressurized. The formed product may be heat-treated in a state where the formed product is clamped by a jig so that the joined surfaces 201, 301 are pressed.

The joining step may be performed in an appropriate inert atmosphere. Examples thereof include a vacuum, an argon atmosphere, or a nitrogen atmosphere. The vacuum atmosphere is preferable, and the argon atmosphere is more preferable. The ceramic sintered bodies 20, 30 can be joined in a mixed gas of argon and nitrogen.

Example 1

Ceramic sintered bodies containing metal silicon, boron carbide, and silicon carbide were prepared as ceramic sintered bodies 20, 30. A carbon powder slurry obtained by dispersing carbon fine powder in a mixed solution containing methylene chloride and isopropyl alcohol was made as a joining slurry 41, and was prepared so that the carbon powder slurry could be sprayed.

The ceramic sintered bodies containing metal silicon, boron carbide, and silicon carbide were made by the following method.

30 parts by weight of silicon carbide powder having an average particle diameter of 0.6 μm, 70 parts by weight of boron carbide powder having an average particle diameter of 25 μm, and 10 parts by weight of carbon black powder having an average particle diameter of 55 nm were dispersed in purified water into which a dispersing agent of 0.1 to 1 part by weight based on the silicon carbide powder, the boron carbide powder, and the carbon black powder was added. The pH of the mixture was adjusted to 8 to 9.5 by ammonia water or the like to make a slurry having a low viscosity of less than 500 CP. After the slurry was mixed in a pot mill or the like for several hours, a binder of 1 to 2 parts by weight based on the silicon carbide powder, the boron carbide powder, and the carbon powder was added to the slurry, and the slurry was mixed. The slurry was then defoamed. An acrylic pipe having an inner diameter of 80 mm was placed on a gypsum plate. The slurry was cast in the acrylic pipe to make a green body having a thickness of about 10 mm. The green body was calcined as follows. The green body was naturally dried, and the green body was then dried at 100 to 150° C. The green body was then degreased with the formed product held at a temperature of 600° C. for 2 hours under a reduced pressure of $1\times10^{-4}$ to $1\times10^{-3}$ torr, and the green body was then held at a temperature of 1700° C. for 1 h. After the green body was calcined, the calcined body was heated to a temperature of 1500° C., and the calcined body was held at 1500° C. for 30 minutes, to impregnate the calcined body with molten silicon, thereby producing a reaction sintered body.

The obtained ceramic sintered body containing metal silicon, boron carbide, and silicon carbide was cut to obtain two cut bodies having a 20 mm×20 mm square cross section and a thickness of 6 mm. The cut bodies were subjected to grinding processing so that Ra=0.2 μm in a joined surface was set, to make two ceramic sintered bodies.

A carbon slurry was sprayed onto the joined surfaces of the two ceramic sintered bodies. After the ceramic sintered bodies were dried, the ceramic sintered bodies were fixed by a carbon jig to make a sample having a shape of 20×40×6 mm.

The fixed sample was heat-treated at 1400° C. in an argon atmosphere of 1 atmospheric pressure in a carbon furnace. The sample was held at 600° C. for 1 hour in the course of temperature rise (a temperature rise rate was set to 300° C./1 hour) up to 1400° C. to evaporate an organic solvent.

Comparative Example 1

Ceramic sintered bodies corresponding to the ceramic sintered bodies 20, 30 were prepared. The ceramic sintered bodies contained metal silicon, boron carbide, and silicon carbide. The ceramic sintered bodies containing metal silicon, boron carbide, and silicon carbide were made under the same conditions as those of Example 1. A joining sample having the same shape as that of Example 1 was also prepared. Furthermore, a cellophane corresponding to a joining layer 40 was prepared as a thermoplastic resin thin film. The cellophane had a thickness of 35 μm.

The two ceramic sintered bodies were fixed by a carbon jig with the cellophane sandwiched between the joined surfaces of the ceramic sintered bodies, to make a sample having a shape of 20×40×6 mm.

The fixed sample was heat-treated at 1400° C. in an argon atmosphere of 1 atmospheric pressure in a carbon furnace. The sample was held at 600° C. for 1 hour in the course of temperature rise (a temperature rise rate was set to 300° C./1 hour) up to 1400° C. to carbonize the cellophane.

Next, the samples obtained by Example 1 and Comparative Example 1 were cut into a block shape of 3 mm×4 mm×40 mm to conduct a cut test for investigating the presence of separation. The results are shown in Table 1.

TABLE 1

| Joining layer | Atmosphere | Heat treatment temperature | Thickness of joining layer | Size during joining | Cutting size | Cutting number | Number of separation-generating | Yield |
|---|---|---|---|---|---|---|---|---|
| Dried fine particle layer | Ar | 1400° C. | 5.0 to 15 μm | 20 mm × 6 mm | 3 mm × 4 mm | 12 pieces | 0 pieces | 100% |
| Resin layer | Ar | 1400° C. | 5.3 to 14 μm | 20 mm × 6 mm | 3 mm × 4 mm | 9 pieces | 3 pieces | 67% |

Twelve blocks of 3 mm×4 mm were cut for the samples of Example 1. No separation was generated in the cut twelve blocks.

On the other hand, nine blocks of 3 mm×4 mm were cut for the samples of Comparative Example 1. Separation was generated in three blocks of the cut nine blocks.

The samples in which no separation was generated were subjected to three-point bending (JISR1601). As a result, it was confirmed that all the samples were broken at the joined surface, and had approximately equal joining strength.

Therefore, when the joining layer was the dried fine particle layer, it was confirmed that the whole surface of the joined body was in a uniform joining state. On the other hand, when the joining layer was formed of a resin, the following description contents were found. Although the joined portion had joining strength having nearly the same level as that of the case where the dried fine particle layer was used, a partial joining failure in the joined surface was caused by the heat contraction of a resin layer during a heat treatment. The joining strength of the whole joined body using the resin layer was lower than that of the whole joined body using the dried fine particle layer. The yield of the joined body using the resin layer was lower than that of the joined body using the dried fine particle layer.

Next, in order to observe the joining states, each of samples having a large joining area of 60 mm×6 mm and prepared by making methods of two types of the fine particle layer and the resin layer was broken at the joined surface, and the broken surface was observed by SEM.

Figure 6:
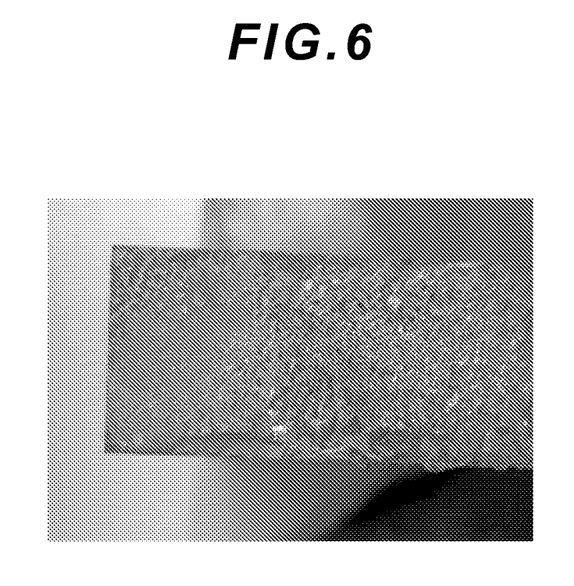
FIG. 6 is a view showing a result of cross-sectional observation in Examples.
Figure 7:
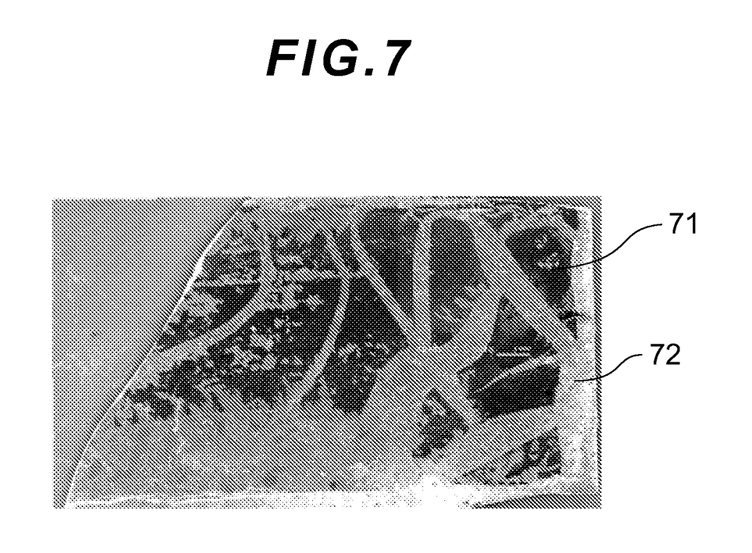
FIG. 7 is a view showing a result of cross-sectional observation in Comparative Examples.

A result of observation of the joined sample using the same fine particle as those of Example 1 is shown in FIG. 6. A result of observation of the joined sample using the same resin layer as that of Comparative Example 1 is shown in FIG. 7. FIGS. 6 and 7 show a result of observation of a section taken in a plane including zx of FIG. 1 and being along the joined surface.

FIG. 6 confirmed that carbon fine particles were uniformly disposed over the whole joined surface in the sample joined by the dried fine particle layer, and the heat contraction of the joining layer was not generated by the heat treatment. On the other hand, FIG. 7 showed that heat contraction of the resin was caused by the heat treatment during joining in the sample joined by the resin layer (in FIG. 7, a black portion 71 was a joined portion in which the resin is carbonized, and a white portion 72 was a portion in which the resin was not present by the heat contraction).

As described above, it was confirmed that the use of the dried fine particle layer enabled uniform joining over the whole joined surface, and provided high joining strength.

Next, a test for investigating the relationship between a heat treatment temperature and joining strength for the sample joined by the dried fine particle layer was conducted.

Example 2

Ceramic sintered bodies were joined under the same conditions as those of Example 1 except that a heat treatment temperature was set to 1300° C. The joining thickness of the obtained joined body measured by SEM observation was about 2 μm.

The heated sample was processed into a test piece of 3×4×40 mm, and the test piece was subjected to three-point bending (JISR1601). As a result, the joined body was broken at the joined surface. The strength of the joined body was 407 MPa.

Example 3

Ceramic sintered bodies were joined under the same conditions as those of Example 1 except that a heat treatment temperature was set to 1300° C. The joining thickness of the obtained joined body was about 6.7 μm. The three-point bending strength of the joined body was 358 MPa.

Example 4

Ceramic sintered bodies were joined under the same conditions as those of Example 1 except that a heat treatment temperature was set to 1400° C. The joining thickness of the obtained joined body was about 5 μm. The three-point bending strength of the joined body was 446 MPa.

Comparative Example 2

Ceramic sintered bodies were joined under the same conditions as those of Example 1 except that a heat treatment temperature was set to 1200° C. The heated sample was in a state where the ceramic sintered bodies could not be joined.

Comparative Example 3

Ceramic sintered bodies were joined under the same conditions as those of Example 1 except that a heat treatment temperature was set to 1600° C. The joining thickness of the obtained joined body was about 4 μm. The three-point bending strength of the joined body was 37 MPa.

Example 5

Ceramic sintered bodies were joined under the same conditions as those of Example 1 except that a heat treatment temperature was set to 1300° C. The joining thickness of the obtained joined body was about 7 μm. The three-point bending strength of the joined body was 340 MPa.

Example 6

Ceramic sintered bodies were joined under the same conditions as those of Example 1 except that a heat treatment temperature was set to 1400° C. The joining thickness of the obtained joined body was about 13 μm. The three-point bending strength of the joined body was 356 MPa.

Example 7

Ceramic sintered bodies were joined under the same conditions as those of Example 1 except that a heat treatment temperature was set to 1300° C. The joining thickness of the obtained joined body was about 35 μm. The three-point bending strength of the joined body was 137 MPa.

Example 8

Ceramic sintered bodies were joined under the same conditions as those of Example 1 except that a heat treatment temperature was set to 1400° C. The joining thickness of the obtained joined body was about 27 μm. The three-point bending strength of the joined body was 166 MPa.

Example 9

A heat treatment temperature was set to 1300° C. A ceramic sintered body containing metal silicon, boron carbide, and silicon carbide was used as a first ceramic sintered body. A boron carbide sintered body was prepared for a second ceramic sintered body. The ceramic sintered body containing metal silicon, boron carbide, and silicon carbide was produced by the same method as that of Example 1. A joining sample having the same shape as that of Example 1 was also prepared. The ceramic sintered bodies were joined under the same conditions as those of Example 1. The joining thickness of the obtained joined body was about 3 μm. The three-point bending strength of the joined body was 331 MPa.

Example 10

A heat treatment temperature was set to 1500° C. A ceramic sintered body containing metal silicon, boron carbide, and silicon carbide was used as a first ceramic sintered body. A boron carbide sintered body was prepared for a second ceramic sintered body. The ceramic sintered body containing metal silicon, boron carbide, and silicon carbide was produced by the same method as that of Example 1. A joining sample having the same shape as that of Example 1 was also prepared. The ceramic sintered bodies were joined under the same conditions as those of Example 1. The joining thickness of the obtained joined body was about 10 μm. The three-point bending strength of the joined body was 155 MPa.

Comparative Example 4

A heat treatment temperature was set to 1600° C. A ceramic sintered body containing metal silicon, boron carbide, and silicon carbide was used as a first ceramic sintered body. A silicon carbide sintered body containing no metal silicon was prepared for a second ceramic sintered body. The ceramic sintered body containing metal silicon, boron carbide, and silicon carbide was produced by the same method as that of Example 1. A joining sample having the same shape as that of Example 1 was also prepared. The ceramic sintered bodies were joined under the same conditions as those of Example 1. The joining thickness of the obtained joined body was about 37 μm. The three-point bending strength of the joined body was 17 MPa.

Figure 8:
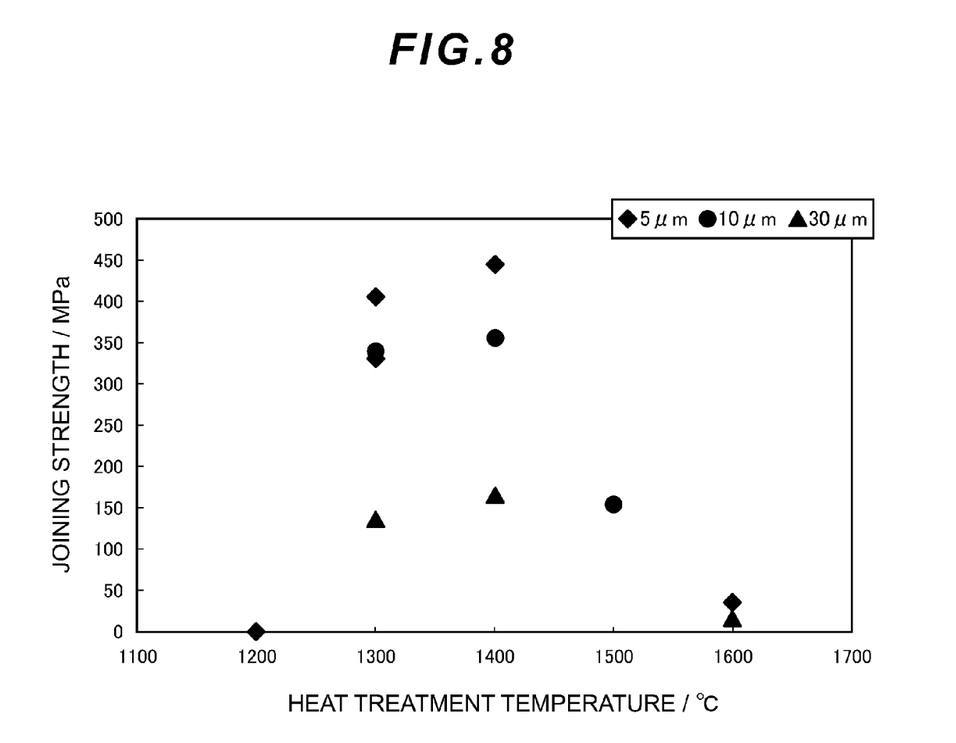
FIG. 8 is a view showing the relationship between a heat treatment temperature and joining strength in the Examples and the Comparative Examples.

The relationship between the heat treatment temperature and the joining strength for every thickness of a joining layer in Examples 2 to 10 and Comparative Examples 2 to 4 is shown in Table 2, Table 3, and FIG. 8. Table 2 shows data of the ceramic sintered body containing Si and B as the second ceramic sintered body. Table 3 shows data of the boron carbide sintered body and the silicon carbide sintered body as the second ceramic sintered body. FIG. 8 shows the relationship between the heat treatment temperature and the joining strength in the Examples and the Comparative Examples.

TABLE 2

| Heat treatment temperature (° C.) | Joining strength (MPa) | | |
|---|---|---|---|
| | 5 μm | 10 μm | 30 μm |
| 1200 | 0 | | |
| 1300 | 358 | | |
| 1300 | 407 | 340 | 137 |
| 1400 | 446 | 356 | 166 |
| 1600 | 37 | | |

TABLE 3

| Heat treatment temperature (° C.) | Joining strength (MPa) | | |
|---|---|---|---|
| | 5 μm | 10 μm | 30 μm |
| 1300 | 331 | | |
| 1500 | | 155 | |
| 1600 | | | 17 |

Table 2, Table 3, and FIG. 8 could confirm that good joining strength was obtained at the heat treatment temperature of 1300° C. to 1500° C. On the other hand, since the heat treatment temperature of 1200° C. was lower than the melting temperature of Si, the diffusion of Si and the production of SiC in the joining layer were insufficient, which could not join the ceramic sintered bodies. It appeared that although the ceramic sintered bodies could be joined at the heat treatment temperature of 1600° C., the joining strength was extremely reduced. The reason for this is considered that a volume change in the joining layer during a heat treatment at a high temperature is large, and a crack is generated in the joining layer. The thinner a film thickness is, the higher the joining strength tends to become.

Next, a test for investigating an effect of a heat treatment atmosphere upon the joining strength was performed.

Example 11

Ceramic sintered bodies were joined under the same conditions as those of Example 1 except that a heat treatment temperature was set to 1300° C., and an atmosphere was set to a vacuum atmosphere. The joining thickness of the obtained joined body was about 2 μm. The three-point bending strength of the joined body was 372 MPa.

On the other hand, the three-point bending strength of the joined body of Example 2 fired at 1300° C. in an Ar atmosphere and having a joining thickness of 2 μm was about 407 MPa.

Example 12

Ceramic sintered bodies were joined under the same conditions as those of Example 1 except that a heat treatment temperature was set to 1400° C. The joining thickness of the obtained joined body was about 15 μm. The three-point bending strength of the joined body was 138 MPa.

Example 13

Ceramic sintered bodies were joined under the same conditions as those of Example 1 except that a heat treatment temperature was set to 1400° C., and an atmosphere was set to a vacuum atmosphere. The joining thickness of the obtained joined body was about 15 μm. The three-point bending strength of the joined body was 200 MPa. On the other hand, in some samples, delamination was generated during the processing step of the test piece.

The results of Examples 11 to 13 are shown in Table 4.

TABLE 4

| | | Joining strength/MPa | |
|---|---|---|---|
| Firing temperature/° C. | Thickness of joining layer/μm | Ar atmosphere | Vacuum atmosphere |
| 1300 | 2 | 407 | 372 |
| 1400 | 15 | 138 | to 200 |

Since the evaporation of Si is not remarkable in a vacuum at 1300° C., it is estimated that the joining strength in an Ar atmosphere has nearly the same level as that in a vacuum atmosphere.

On the other hand, when a temperature was about 1400° C. in the vacuum atmosphere, the evaporation of Si from the SiC reaction sintered body starts. Thereby, it is estimated that joining failure is generated in some joined bodies joined in the vacuum atmosphere. On the other hand, since the evaporation of Si is hardly generated even at 1400° C. in the Ar atmosphere, joining strength higher than that in the vacuum atmosphere can be stably obtained.

Example 14

Ceramic sintered bodies were joined under the same conditions as those of Example 1 except that a heat treatment temperature was set to 1400° C., and an atmosphere was set to a nitrogen atmosphere. The joining thickness of the obtained joined body was about 4 μm. The three-point bending strength of the joined body was 53 MPa.

Example 15

Ceramic sintered bodies were joined under the same conditions as those of Example 1 except that a heat treatment temperature was set to 1300° C., and a joining slurry 41 was boron carbide slurry obtained by dispersing boron carbide powder in terpineol.

Figure 9:
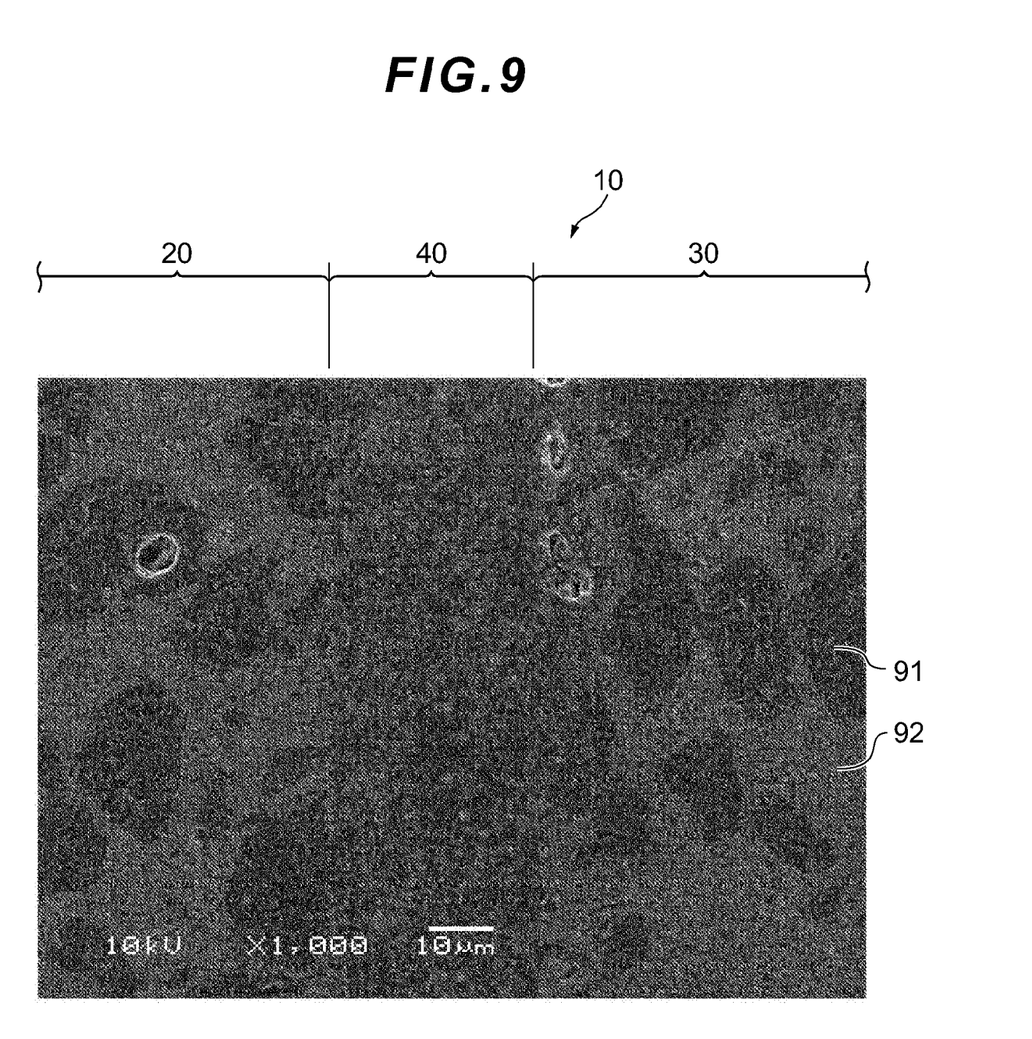
FIG. 9 is an electron microscope photograph of a ceramic joined body containing a joining layer.

The electron microscope photograph of the ceramic joined body containing a joining layer is shown in FIG. 9. The ceramic joined body containing the ceramic sintered bodies 20, 30 joined by a joining layer 40 primarily containing metal silicon was observed. The ceramic sintered bodies 20, 30 are made of a boron carbide part 91 and a silicon carbide part 92. The joining thickness of the obtained joined body was about 41 μm. The three-point bending strength of the joined body was 187 MPa.

Example 16

Ceramic sintered bodies were joined under the same conditions as those of Example 15 except that a heat treatment temperature was set to 1400° C. The joining thickness of the obtained joined body was about 25 μm. The three-point bending strength of the joined body was 72 MPa.

Example 17

Ceramic sintered bodies were joined under the same conditions as those of Example 15 except that a heat treatment temperature was set to 1300° C., and a heat treatment atmosphere was set to a vacuum. The joining thickness of the obtained joined body was about 8 μm. The three-point bending strength of the joined body was 275 MPa.

As described above, the embodiment of the invention has been described with reference to the specific examples. However, the invention is not limited to these examples. That is, those skilled in the art can suitably modify the examples, and such modifications are also encompassed within the scope of the invention as long as they fall within the spirit of the invention. For example, the components of the above examples and the layout, material, condition, shape, size or the like thereof are not limited to those illustrated, but can be suitably modified. Furthermore, the components of the above embodiment can be combined with each other as long as technically feasible, and such combinations are also encompassed within the scope of the invention as long as they fall within the spirit of the invention.

What is claimed is:

1. A method for producing a ceramic joined body obtained by joining a pair of ceramic sintered bodies containing silicon carbide to each other, each of the ceramic sintered bodies having a joined surface, the method comprising:
 a preparing step of preparing the pair of ceramic sintered bodies at least one of which is formed by a reaction sintering method and comprises free silicon and a boron element;
 a forming step of interposing a joining slurry between the joined surfaces of the pair of ceramic sintered bodies and thereafter drying the joining slurry, to form a particle layer, the joining slurry obtained by dispersing particles containing a carbon element in an organic solvent; and
 a joining step of heating the pair of ceramic sintered bodies at 1300° C. to 1400° C. in an inert atmosphere with the pair of ceramic sintered bodies held so that the particle layer is pressurized, without externally adding metal silicon, to introduce free silicon from only the ceramic sintered body into the particle layer, thereby forming a joining layer containing at least silicon carbide so that the pair of ceramic sintered bodies are joined to each other, to obtain the ceramic joined body.

2. The method for producing a ceramic joined body according to claim 1, wherein the particle layer formed in the forming step further comprises a boron element.

3. The method for producing a ceramic joined body according to claim 1, wherein the inert atmosphere is an argon atmosphere in the joining step.

4. The method for producing a ceramic joined body according to claim 1, wherein the joining slurry is interposed between the joined surfaces of the pair of ceramic sintered bodies by spray coating in the forming step.

5. The method for producing a ceramic joined body according to claim 1, wherein the ceramic sintered body comprises free silicon, silicon carbide, and boron carbide.

6. The method for producing a ceramic joined body according to claim 1, wherein the particle layer formed in the forming step further comprises boron carbide.

* * * * *